United States Patent [19]

Taniguchi et al.

[11] Patent Number: 4,940,602

[45] Date of Patent: Jul. 10, 1990

[54] PROCESS OF PRODUCING AN ANTI-REFLECTION OPTICAL ARTICLE

[75] Inventors: Takashi Taniguchi, Yasu; Tetsuya Seki, Kyoto, both of Japan

[73] Assignee: Toray Industries, Inc., Tokyo, Japan

[21] Appl. No.: 398,473

[22] Filed: Aug. 25, 1989

Related U.S. Application Data

[62] Division of Ser. No. 114,061, Oct. 29, 1987, Pat. No. 4,904,525.

[30] Foreign Application Priority Data

Feb. 13, 1987 [JP] Japan ................................. 62-29702

[51] Int. Cl.$^5$ .............................................. B05D 3/06
[52] U.S. Cl. ......................................... 427/40; 427/38; 427/41; 427/387; 427/393.5; 427/412.1
[58] Field of Search ..................... 427/38, 40, 41, 387, 427/393.5, 412.1

[56] References Cited

U.S. PATENT DOCUMENTS 4,361,598  11/1982  Yolda ................................. 427/74
4,590,117   5/1986  Taniguchi et al. ................. 428/212

Primary Examiner—Bernard Pianalto
Attorney, Agent, or Firm—Birch, Stewart, Kolasch & Birch

[57] ABSTRACT

An anti-reflection optical article which has an excellent anti-reflection properties, scratch resistance, impact resistance, flexibility, anti-static properties and weatherability, and which is easy to dye is disclosed. The anti-reflection optical article of the present invention comprises a transparent plastic substrate; a hard coat film formed on a surface of the substrate, the film having an index of refraction of not less than 1.52; and a fluorine-containing organopolysiloxane-based film with a thickness of 10 nm to 500 nm, which has an index of refraction lower than that of the hard coat film by not less than 0.02, and which is formed on the hard coat film.

5 Claims, No Drawings

PROCESS OF PRODUCING AN ANTI-REFLECTION OPTICAL ARTICLE

This application is a divisional of copending application Ser. No. 07/114,061 filed on Oct. 29, 1987, now U.S. Pat. No. 49,004,525.

BACKGROUND OF THE INVENTION

I. Field of the Invention

This invention relates to an anti-reflection optical article with excellent scratch resistance, dyeability, impact resistance, chemical resistance, flexibility and weatherability. The anti-reflection optical article of the present invention is suitable for optics and, for example, optical lenses such as lenses of spectacles and cameras.

II. Description of the Prior Art

When an object is seen through a transparent material, if reflected rays are strong and a reflected image is clear, vision is disturbed, and a reflected image such as so-called ghosts or flares are formed to give an unpleasant feel to one's eyes. In the case of using a looking glass, the content cannot be clearly seen because of rays reflected from the glass surface.

There is also a problem in that the optical articles have a tendency to attract dust. Since the attraction is due to an electrostatic force retained by the optical article, the dust is hardly removed by simply wiping the optical article.

A number of measures have been proposed for preventing the reflection, and some of them are currently used. Obtaining an anti-reflection effect by applying a liquid composition to a transparent substrate is disclosed, for example, in U.S. Pat. No. 4,361,598, Japanese Patent Disclosure (Kokai) Nos. 167448/83, 211701/83, 43601/83 and 49501/84.

However, the optical articles disclosed in Japanese Patent Disclosure (Kokai) Nos. 167448/83 and 211701/83 are made of glass, so that they cannot be dyed. Not only in view of the dyeability, but also in view of the lightness, flexibility and processability, plastic substrates are desired.

Optical articles having a plastic substrate are disclosed, for example, in U.S. Pat. No. 4,590,117 and Japanese Patent Disclosure (Kokai) Nos. 43601/83 and 49501/84. However, those disclosed in these references employ a structure including two or more layers, so that the productivity, reproducibility and uniformity of the plane are not good.

It is also known that a fluorine-containing organopolysiloxane-based thin film formed on the surface of an optical article for preventing the reflection (Japanese Patent Disclosure (Kokai) No. 40845/85).

On the other hand, for the prevention of attachment of dust to the optical article, charging-preventing agents comprising a surface active agent, which are to be applied to the optical article, are commercially available. However these agents show their effect only temporarily.

As to the prevention of the charging of the plastic mold articles, various methods are known such as, for example, those disclosed in Japanese Patent Publication (Kokoku) Nos. 15494/80 and 21628/85.

SUMMARY OF THE INVENTION

The object of the present invention is to provide an anti-reflection optical article having excellent anti-reflection properties, scratch resistance, dyeability, impact resistance, chemical resistance, flexibility and weatherability.

The above object and other objects of the present invention may be accomplished by providing an anti-reflection optical article comprising a transparent plastic substrate; a hard coat film formed on a surface of the substrate, the film having an index of refraction of not less than 1.52; and a fluorine-containing organopolysiloxane-based film with a thickness of 10 nm to 500 nm, which has an index of refraction lower than that of the hard coat film by not less than 0.02, and which is formed on the hard coat film.

This invention further provides a process of producing the above-described anti-reflection optical article, comprising the steps of providing the transparent plastic substrate on which the hard coat film having an index of refraction of not less than 1.52 is formed; applying a liquid coating composition comprising a fluorine-containing organic silicon compound and/or a hydrolysate thereof, on the hard coat film; and curing the applied composition to form the fluorine-containing organopolysiloxane-based film with an index of refraction lower than that of the hard coat film by not less than 0.02.

The anti-reflection optical article of the present invention has an excellent anti-reflection property, and a uniform reflection color may be imparted. Since the surface of the optical article of the present invention is hard, it has an excellent scratch resistance, impact resistance and durability. The optical article of the present invention may be easily dyed and the dying speed is high. Further, the outer appearance after dying is nice. The surface of the optical article of the present invention is smooth, so that it is hardly scratched.

DETAILED DESCRIPTION OF THE PREFERRED EMBODIMENTS

As stated above, the anti-reflection optical article of the present invention includes a transparent plastic substrate. Any plastic may be used for forming the substrate. Preferred examples of the plastics which may be used for forming the substrate include acrylic resins, polystyrenes, polycarbonates, diethyleneglycolbisallylcarbonate polymers, di-(meta)-methacrylate polymers of (halogenated)bisphenol A and copolymers thereof, urethane-modified (meta)acrylate polymers of (halogenated)bisphenol A and copolymers thereof.

A hard coat film is formed on a surface of the substrate. The term "hard coat film" used herein means a film having a pencil hardness of 4H or more as determined by the method according to JIS K5400.

The hard coat film has an index of refraction of not less than 1.52. If the index of refraction is less than 1.52, the anti-reflection property may not be obtained. In view of further promoting the anti-reflection property, it is preferred that the index of refraction of the hard coat film be not less than 1.54.

Any material may be used for forming the hard coat film as long as it has a pencil hardness of not less than 4H and an index of refraction of not less than 1.52. Preferred examples of the materials which may be used for forming the hard coat film may include organic resins such as acrylic resin, polyester resin, organopolysiloxane resin, polyurethane, cellulose derivatives, epoxide polymer, nylon resin, melamine resin and inorganic compounds such as inorganic oxides such as titanium oxide and zirconium oxide obtained from metal alkoxide or metal chelate.

It should be noted, however, in view of further increasing the surface hardness and further promoting the adhesion with the fluorine-containing organopolysiloxane-based film, and in view of the feasibility to give the high index of refraction, it is preferred that the hard coat film contain inorganic microparticles having a high index of refraction.

Preferred exmaples of the microparticles to be contained in the hard coat film may include microparticles of oxides of metals such as tantalum, aluminum, titanium, zirconium, tin and antimony. These oxides are preferred since they not only give a high index of refraction, but also give a great hardness and high transparency. Among the above-mentioned oxides, oxides of tantalum, zirconium, titanium and antimony are especially preferred in view of their stability. These microparticles may be used individually or in combination. The oxide may be a composite oxide containing silicon or the like.

The inorganic microparticles preferably have a mean particle size of about 1–300 nm, more preferably about 5–200 nm, in view of not degrading the transparency of the hard coat film.

If the content of the inorganic microparticles is too small, the effect of the microparticles may not be shown, and if its content is too great, the hard coat film may have a tendency to be cracked. Therefore, the content of the inorganic microparticles in the hard coat film is preferably 10–75% by weight, and more preferably 15–60% by weight.

The thickness of the hard coat film varies depending on the plastic material forming the transparent substrate and should be selected to have a pencil hardness of not less than 4H. If the hard coat film is too thin, it is difficult to obtain a sufficient hardness and a sufficient dyeability, and if the hard coat film is too thick, it is difficult to obtain a uniform film and the impact resistance may be degraded. Thus, the thickness of the hard coat film is usually 0.5 μm to 20 μm.

The hard coat film may be formed on the substrate by applying a liquid coating composition comprising the above-described resin on the plastic transparent substrate and by curing the applied composition.

A fluorine-containing organopolysiloxane-based film (hereinafter referred to as "top film" for short) with a thickness of 10–500 nm and an index of refraction which is lower than that of the hard coat film by 0.02 or more is formed on the hard coat film.

The thickness of the top film is 10 nm to 500 nm, preferably 50 nm to 300 nm. If the thickness of the top film is smaller than 10 nm, sufficient anti-reflection properties and a sufficient surface hardness may not be obtained. If the thickness of the top film is greater than 500 nm, and anti-reflection effect may not be obtained.

The preferred top film is one obtained by applying to the hard coat film a liquid composition comprising a fluorine-containing organic silicon compound of the formula (I) or a hydrolysate thereof:

$$(R^1Q)SiX_aY_{3-a} \qquad (I)$$

wherein $R^1$ is a $C_1$–$C_{20}$ fluorine-containing alkyl group which may contain one or more ether bonds and/or ester bonds; Q is a divalent organic group; X is a $C_1$–$C_4$ alkyl group; Y is a halogen, alkoxy or $RCOO^-$ group (wherein R is hydrogen or a $C_1$–$C_4$ alkyl group); and a is an integer of 0 or 1.

Preferred examples of the fluorine-containing compound of the formula (I) may include 3,3,3-trifluoropropyltrialkoxysilane, 3,3,3-trifluoropropylmethyl-dialkoxysilane and 3-trifluoroacetoxypropyltrialkoxysilane.

It is preferred that the compound expressed by the formula (I) be contained in the top film in the amount of at least 10% by weight or in cases where the index of refraction of the hard coat film is not so high, in the amount of at least 15% by weight.

To further improve the abrasion resistance, scratch resistance, impact resistance, chemical resistance, flexibility, light resistance and weatherability of the combination of the hard coat film and the top film, it is preferred that one or more of organic silicon compounds of the formula (II) be contained in the top film along with the above-described fluorine-containing organopolysiloxane of the formula (I):

$$R^3_b R^4_c SiZ_{4-(b+c)} \qquad (II)$$

wherein $R^3$ and $R^4$ are independently alkyl, alkenyl or aryl group or a hydrocarbon group containing halogen, epoxy, glycidoxy, amino, mercapto, methacryloxy or cyano group; Z is a hydrolyzable group; and b and c independently mean 1 or 0.

Preferred examples of the compounds represented by the formula (II) may include tetraalkoxysilanes such as methyl silicate, ethyl silicate, n-propyl silicate, i-propyl silicate, n-butyl silicate, sec-butyl silicate and t-butyl silicate and hydrolysates thereof;
trialkoxysilanes, triacyloxysilanes and triphenoxysilanes such as methyltrimethoxysilane, methyltriethoxysilane, methyltrimethoxyethoxysilane, methyltriacetoxysilane, methyltripropoxysilane, methyltributoxysilane, ethyltrimethoxysilane, ethyltriethoxysilane, vinyltrimethoxysilane, vinyltriethoxysilane, vinyltriacetoxysilane, vinyltrimethoxyethoxysilane, phenyltrimethoxysilane, phenyltriethoxysilane, phenyltriacetoxysilane, γ-chloropropyltrimethoxysilane,
γ-chloropropyltriethoxysilane,
γ-chloropropyltriacetoxysilane,
γ-methacryloxypropyltrimethoxysilane,
γ-aminopropyltrimethoxysilane,
γ-aminopropyltriethoxysilane,
γ-mercaptopropyltrimethoxysilane,
γ-mercaptopropyltriethoxysilane, N-β-(aminoethyl)-γ-aminopropyltrimethoxysilane,
β-cyanoethyltriethoxysilane, methyltriphenoxysilane,
chloromethyltrimethoxysilane,
chloromethyltriethoxysilane,
glycidoxymethyltrimethoxysilane,
glycidoxymethyltriethoxysilane,
α-glycidoxyethyltrimethoxysilane,
α-glycidoxyethyltriethoxysilane,
β-glycidoxyethyltrimethoxysilane,
β-glycidoxyethyltriethoxysilane,
α-glycidoxypropyltrimethoxysilane,
α-glycidoxypropyltriethoxysilane,
β-glycidoxypropyltrimethoxysilane,
β-glycidoxypropyltriethoxysilane,
γ-glycidoxypropyltrimethoxysilane,
γ-glycidoxypropyltriethoxysilane,
γ-glycidoxypropyltripropoxysilane,
γ-glycidoxypropyltributoxysilane,
γ-glycidoxypropyltrimethoxyethoxysilane,
γ-glycidoxypropyltriphenoxysilane,
α-glycidoxybutyltrimethoxysilane,
α-glycidoxybutyltriethoxysilane,
β-glycidoxybutyltrimethoxysilane, β-glycidoxybutyltriethoxysilane,
γ-glycidoxybutyltriemthoxysilane,
γ-glycidoxybutyltriethoxysilane,
δ-glycicdoxybutyltrimethoxysilane,
δ-glycidoxybutyltriethoxysilane,
(3,4-epoxycyclohexyl)methyltrimethoxysilane,
(3,4-epoxycyclohexyl)methyltriethoxysilane,
β-(3,4-epoxycyclohexyl)ethyltrimethoxysilane,
β-(3,4-epoxycyclohexyl)ethyltriethoxysilane,
β-(3,4-epoxycyclohexyl)ethyltripropoxysilane,
β-(3,4-epoxycyclohexyl)ethyltributoxysilane,
β-(3,4-epoxycyclohexyl)ethyltrimethoxyethoxysilane,
β-(3,4-epoxycyclohexyl)ethyltriphenoxysilane,
γ-(3,4-epoxycyclohexyl)propyltrimethoxysilane,
γ-(3,4-epoxycyclohexyl)propyltriethoxysilane,
δ-(3,4-epoxycyclohexyl)butyltrimethoxysilane and
δ-(3,4-epoxycyclohexyl)butyltriethoxysilane as well as hydrolysates thereof; and dialkoxysilanes, diphenoxysilanes and diacyloxysilanes such as dimethyldiemthoxysilane, phenylmethyldiemthoxysilane,
dimethyldiethoxysilane, phenylmethyldiethoxysilane,
γ-chloropropylmethyldimethoxysilane,
γ-chloropropylmethyldiethoxysilane,
dimethyldiacetoxysilane,
γ-methacryloxypropylmethyldimethoxysilane,
γ-methacryloxypropylmethyldiethoxysilane,
γ-mercaptopropylmethyldimethoxysilane,
γ-mercaptopropylmethyldiethoxysilane,
γ-aminopropylmethyldimethoxysilane,
γ-aminopropylmethyldiethoxysilane,
methylvinyldimethoxysilane, methylvinyldiethoxysilane,
glycidoxymethylmethyldimethoxysilane,
glycidoxymethylmethyldiethoxysilane,
α-glycidoxyethylmethyldimethoxysilane,
α-glycidoxyethylmethyldiethoxysilane,
β-glycidoxyethylmethyldimethoxysilane,
β-glycidoxyethylmethyldiethoxysilane,
α-glycidoxypropylmethyldimethoxysilane,
α-glycidoxypropylmethyldiethoxysilane,
β-glycidoxypropylmethyldiemthoxysilane,
β-glycidoxypropylmethyldiethoxysilane,
γ-glycidoxypropylmethyldimethoxysilane,
γ-glycidoxypropylmethyldiethoxysilane,
γ-glycidoxypropylmethyldipropoxysilane,
γ-glycidoxypropylmethyldibutoxysilane,
γ-glycidoxypropylmethyldimethoxyethoxysilane,
γ-glycidoxypropylmethyldiphenoxysilane,
γ-glycidoxypropylmethyldiacetoxysilane,
γ-glycidoxypropylethyldiethoxysilane,
γ-glycidoxypropylvinyldimethoxysilane,
γ-glycidoxypropylvinyldiethoxysilane,
γ-glycidoxypropylphenyldimethoxysilane and
γ-glycidoxypropylphenyldiethoxysilane, as well as hydrolysates thereof.

For the purpose of imparting dyeability, the organic silicon compounds having an epoxy group or a glycidoxy group are preferred.

To lower the curing temperature and to promote the curing, it is preferred that the fluorine-containing organic silicon compound of the formula (I) or the mixture of the fluorine-containing silicon compound and the organic silicon compound of the formula (II) be use after being hydrolyzed.

Hydrolysis may be conducted by adding pure water or an aqueous solution of an acid such as hydrochloric acid, acetic acid and sulfuric acid to the organic silicon compound and by stirring the resulting mixture. By controlling the amount of the water or the aqueous acid solution to be added, the degree of hydrolysis may easily be controlled. In view of the promotion of the curing, it is preferred that the water or the aqueous acid solution be added in the amount of not less than the equimolar of the —Y group in the formula (I) and not more than three times of the mole number of the —Y group.

Although the hydrolysis may be conducted without using a solvent because alcohols and the like are generated, for the purpose of conducting the hydrolysis uniformly, the hydrolysis may be conducted after mixing the organic silicon compounds with a solvent. Further, it is possible to partly remove the alcohols and the like by heating and/or by reduced pressure, and it is also possible to add an appropriate solvent after a portion of the alcohols and the like are removed.

Preferred examples of the solvent may include alcohols such as ethanol, esters such as butyl acetate, ethers such as diethylether, dioxane, ketones such as methylisobutyl ketone, halogenated hydrocarbons such as 1,1,2-trichloroethane, and aromatic hydrocarbons such as toluene and xylene. Those solvents may be used individually or in combination. To promote the hydrolysis reaction, the mixture may be heated to a temperature higher than room temperature. In contrast, the mixture may be cooled to a temperature lower than room temperature in order to conduct the hydrolysis reaction without causing preliminary polymerization.

When applying the hard coat film on the plastic transparent substrate, or when applying the top film on the hard coat film, the surface of the transparent substrate or the hard coat film is preferred to be subjected to a pretreatment for the purpose of cleaning the surface, promoting the adhesivity, and promoting water resistance. Effective pretreatment may include activated gas treatment and chemical treatment.

Activated gas treatment means a treatment with ions, electrons or excited gas which are generated under the normal pressure or under reduced pressure. The activated gas may be generated by, for example, corona discharge and high voltage discharge by using direct electric current, low frequency wave, high frequency wave or microwave under reduced pressure. The treatments with the low temperature plasma obtained by high frequency wave discharge in reduced pressure and corona discharge treatment are especially preferred.

Examples of the gas to be used herein may include oxygen, nitrogen, hydrogen, carbon dioxide, sulfur dioxide, helium, neon, argon, Freon (tradename of Du Pont), water vapor, ammonia, carbon monoxide, chlorine, nitrogen monoxide and nitrogen dioxide.

These gases may be used individually or in combination. In view of improving the adhesivity, a gas containing oxygen is preferred and air may be used advantageously. Pure oxygen gas is still more preferred. For the purpose of improving the adhesivity, the activated gas treatment may be conducted at an elevated temperature.

On the other hand, examples of the chemical treatment may include an alkali treatment such as by sodium hydroxide, acid treatment such as by hydrochloric acid, sulfuric acid, potassium permanganate and potassium dichromate, and treatment with an organic solvent having an aromatic ring.

The above pretreatments may be conducted in combination continuously or stepwise.

For the curing of the liquid composition for forming the hard coat film or the top film, a curing agent may be used to promote the curing and enabling the curing to be conducted under a low temperature. As the curing agent, various curing agents for epoxy resins and various curing agents for organic silicon resins may be used.

Examples of the curing agents may include various organic acids and acid anhydrides thereof, nitrogen-containing organic compounds, various metal complexes, metal alkoxides, and various salts such as organic carboxylates and carbonates of alkali metals. The curing agents may be used individually or in a combination.

Among these curing agents, in view of the stability of the composition and coloring of the coated film, aluminum chelates represented by the formula (III) are especially preferred:

(III)

wherein X is OL (L is a $C_1$–$C_4$ alkyl); Y is a ligand selected from the group consisting of $M^1COCH_2COM^2$ ($M^1$ and $M^2$ are independently a $C_1$–$C_4$ alkyl) and $M^3COCH_2COOM^4$ ($M^3$ and $M^4$ are independently a $C_1$–$C_4$ alkyl); n is 0, 1 or 2.

Among those represented by the formula (III), especially preferred are aluminum acetylacetonate, aluminum bisethylacetoacetatemonoacetylacetonate, aluminum-di-n-butoxide-monoethylaceto acetate and aluminum-di-iso-propoxide-monomethylaceto acetate, in view of the solubility, stability and curing power as a curing agent. These compounds may be used individually or in a combination.

To improve the flow of the applied composition, and to improve the smoothness of the surface of the film to reduce the friction coefficient of the film surface, a surface active agent may be incorporated in the composition to be applied. Examples of the surface active agent may include block or graft polymers of dimethylsiloxane and alkylene oxide; and fluorine-based surface active agents.

Dyes or pigments may be added to the composition for coloring the film. Further, fillers and organic polymers may be incorporated in the composition to improve the applicability of the composition, intimacy to the substrate or film and to improve the physical properties of the film. Still further, to improve the weatherability, ultraviolet ray absorbing agents may be contained in the composition. To improve the heat degration resistance, anti-oxidants may be contained in the composition.

To increase the surface hardness and to prevent the electric charging, silica sol of a large molecular weight silic acid anhydride in the form of a colloidal dispersion in water and/or an organic solvent such as ethanol may preferably be added to the composition. In particular, when the silica sol is added to the top film, the abrasion resistance of the top film is improved very much such that the top film may be resistant against the abrasion by Carborundum (tradename of Carborundum) powder. Preferred examples of the silicic acid may include colloidalsilica of which average radius is 0.5–100 nm and which is acidic.

To promote the dyeability, various epoxy resins, melamine resins and nylon resins may be added to the composition.

The above-described additives may be added to the liquid composition in the amount of, for example, 5 to 70 wt % based on dry weight.

When applying the coating composition, the composition may be diluted with a diluent for controlling the thickness of the applied coating and for making the application operation easy. Preferred examples of the diluent may include water, alcohols such ethanol, esters such as butyl acetate, ethers such as diethyleneglycol-dimethyl ether, ketones such as methyl-isobutyl ketone and halogenated hydrocarbons such as 1,1,2-trichloroethane.

The reflectance of the surface of the optical article of the present invention, which surface requires anti-reflection property, is not more than 2.7%. In cases in which the anti-reflection property is required for both surfaces of the optical article, such as in the case of the lens of spectacles, the total reflectance of the both surfaces is not more than 5.4%, i.e., the transmittance of the whole optical article is not less than 94.6%.

In a preferred embodiment of the present invention, the electric charging is reduced while keeping the anti-reflection property and other excellent properties of the above-described optical article of the present invention. In this embodiment, the average fluorine to silicon ratio (F/Si) by weight in the entire top film is 0.02 to 10, and the ratio in the uppermost region of the top film is less than 80% that of the entire top film. The term "uppermost region" herein means the region from the surface to a depth of 1 nm to 30 nm from the surface. If the fluorine to silicon ratio is less than 0.02, anti-reflection property may be degraded, and if it is more than 10, the hardness of the top film may be reduced. If the fluorine to silicon ratio in the uppermost region in the top film is not less than 80%, the prevention of electric charging may not be accomplished.

This structure of the top film may be obtained by, for example, subjecting the top film to the above-mentioned activated gas treatment. The conditions of the activated gas treatment may be appropriately selected by those skilled in the art in view of the required anti-static property.

It is also useful for preventing the electric charging to form on the top film a second fluorine-containing organopolysiloxane-based film having a F/Si ratio by weight of less than 80% that of the top layer. By so doing, the same effect brought about by setting the F/Si ratio by weight in the uppermost region of the top layer to less than 80% may be obtained. The thickness of the second film is preferably 1 nm to 30 nm because a film thinner than 1 nm is difficult to prepare, and if the film is thicker than 30 nm, the anti-reflection property may be degraded.

The second fluorine-containing organopolysiloxane film may be formed in a similar manner as in forming the top film, after chemical treatment of the top film. Examples of the chemical treatment may include treatments with alkali such as sodium hydroxide; with acid such as hydrochloric acid, sulfuric acid, potassium permanganate and potassium dichromate; and with organic solvent having an aromatic ring such as toluene, xylene, benzyl alcohol. The chemical treatment may be conducted individually or in combination continuously or stepwise.

The fluorine/silicon weight ratio may be determined by a well-known X-ray photoelectron analysis (ESCA).

Since the anti-reflection optical article of the present invention has an excellent anti-reflection property, durable hard surface, dyeability and anti-static property, it is suited for use not only as a lens of sunglasses and as an ophthalmic lens, but also as a camera lens and as a binocular lens.

The present invention will now be described by way of examples. The examples are presented for the purpose of illustration only, and they should not be interpreted as limiting the scope of the invention in any way.

EXAMPLE 1, COMPARATIVE EXAMPLE 1

(1) Preparation of Transparent Plastic Substrate

A transparent plastic substrate was obtained by cast polymerization of 270 parts by weight of a polyfunctional acrylate monomer and 30 parts by weight of styrene using di-isopropylperoxide as an initiator, the polyfunctional acrylate monomer having 0.9 mole of hexamethylenediisocyanate per 1 mole of hydroxide group-containing compound prepared by bonding via ester bond tetrabromobisphenol A having 2 moles of ethylene oxide adduct with 1 mole of acrylic acid. The index of refraction of the thus obtained resin was 1.61.

(2) Preparation of Coating Composition for Forming Hard Coat Film (a) Preparation of Hydrolysate of γ-glycidoxypropyltrimethoxysilane To a reactor with a rotating member of a magnetic stirrer, 95.3 g of γ-glycidoxypropyltrimethoxysilane was fed. While keeping the temperature of the liquid at 10° C., 21.8 g of 0.01 N aqueous hydrochloric acid was added dropwise while stirring the mixture with a magnetic stirrer. After finishing the dropwise addition of the hydrochloric acid, cooling is stopped to obtain a hydrolysate of γ-glycidoxypropyltrimethoxysilane.

(b) Preparation of Coating Composition

To the thus obtained hydrolysate, were added 216 g of dimethylformamide, 0.5 g of fluorine-based surface active agent and 67.5 g of bisphenol A type epoxy resin (commercially available from Shell Chemical Co. under the tradename of Epicoat 827), and the mixture was stirred. To the mixture, were added 270 g of colloidal antimony pentaoxide sol (mean particle size of 60 nm, commercially available from Nissan Chemical Industries, Ltd., Tokyo, Japan, under the tradename of Antimony Sol A-2550) and 13.5 g of aluminum acetylacetonate, and then 1.1 g of acetylacetone Cu(II) as a transition metal compound was added. The resulting mixture was well stirred to obtain a coating composition for forming the hard coat film.

(3) Preparation of Coating Composition for Forming Fluorine-Containing Organopolysiloxane Film (a) Preparation of Hydrolysate To a reactor with a rotating member, 4.9 g of methyltrimethoxysilane and 3.5 g of 3,3,3-trifluoropropyltrimethoxysilane were fed. While keeping the temperature of the liquid at 10° C., 2.8 g of 0.01 N aqueous hydrochloric acid was added dropwise while stirring the mixture with a magnetic stirrer. After finishing the addition of the hydrochloric acid, cooling is stopped to obtain a hydrolysate.

(b) To the thus obtained hydrolysate, were added 56.0 g of n-propylalcohol, 24.0 g of distilled water, 7.5 g of ethylCellosolve, 1.0 g of silicone-based surface active agent in n-propylalcohol in a concentration of 5% by weight, and 0.24 g of aluminum acetylacetonate. The mixture was well stirred to obtain a coating composition.

(4) Preparation of Anti-Reflection Optical Article

The transparent plastic substance obtained in (1) was coated with the coating composition obtained in (2) by dipping the substrate in the composition. The thus coated lens was subjected to a preliminary curing at 110° C. for 12 minutes, and then to a curing treatment at 110° C. for 4 hours. The thus formed hard coat film has an index of refraction of 1.58, pencil hardness of 8H and a thickness of 2.8 μm.

The thus obtained cured lens was subjected to a pretreatment using a surface treatment plasma-generating apparatus (PR501A, commercially available from Yamato Kagaku Co., Japan) at an oxygen flow of 100 ml/min. and at an output power of 50W for 1 minute.

Then the coating composition obtained in (3) (b) was applied on the pretreated hard coat film by spin coating with a rotation speed of 3,500 rpm and a rotation time of 30 seconds. After the spin coating, the coated composition was subjected to a preliminary curing at 82° C. for 12 minutes and then to a curing treatment at 93° C. for 4 hours to form a fluorine-containing polyorganosiloxane film. The thus formed film has a thickness of 100 nm and a index of refraction of 1.39.

The total light transmittance of the thus prepared optical article was 96.1%.

For comparision, an optical article was prepared in the same manner except that the hard coat film was omitted.

The obtained optical articles were tested for their properties as described in (5) below. The results are shown in the following Table 1.

TABLE 1

|  | Example 1 | Comparative Ex. 1 |
| --- | --- | --- |
| Total Light Transmittance (%) | 96.1 | 96.3 |
| Dyeability (%) | 40.0 | 90.2 |
| Appearance after Dying | good | — |
| Steel Wool Hardness | A | C |

As is seen from Table 1, the anti-reflection lens having the hard coat film was satisfactory in all of anti-reflection properties, dyeability and surface hardness, while the one having no hard coat film had insufficient dyeability and surface hardness and cannot be used practically.

(5) Testing Methods

(5)-1 Dyeability

The dyeability is expressed in terms of the total light transmittance of the article after dipping the article in a disperse dye (mixture of 3 colors of red, blue and yellow) at 93° C. for 15 minutes.

(5)-2 Appearance After Dying

Appearance was examined by gross examination with eyes.
Good: Lens was uniformly dyed.
Bad: Lens was non-uniformly dyed.

(5)-2 Steel Wool Hardness

The coating film was abraded with #0000 steel wool, and the degree of scratching of the film wa examined by gross examination. The evaluation criteria are as follows:
A: No scratch are given even by a strong abrasion.

B: Scratches are given by a strong abrasion.
C: Scratches are given by a weak abrasion.

EXAMPLES 2–4, Comparative Example 2

A diethyleneglycolbisallyl carbonate polymer lens (diameter of 71 mm, thickness of 2.1 mm, CR-39 Planolens, commercially available from Pittsburgh Plate Glass) having an index of refraction of 1.50 was used as the plastic transparent substrate after dipping in aqueous sodium hydroxide solution with a concentration of 20 wt % and washing. As a coating composition for forming the fluorine-containing organopolysiloxane film, compositions similar to that used in Example 1 but having a varying ratio (shown in Table 2) of methyltrimethoxysilane to 3,3,3-trifluoropropyltrimethoxysilane and γ-glycidoxypropyltrimethoxysilane were used. Optical articles were prepared in the same manner as in Example 1.

For comparison, an optical article was prepared in the same manner except that the hard coat film was omitted.

The results are shown in Table 2. As is apparent from Table 2, the optical article having no hard coat film (Comparative Example 2) had very low surface hardness.

The methods of determining the half life and conducting the punch dust test were as follows:

(A) Half Life of Voltage of Electric Charge

Using a static honest meter, the articles were charged at 10 kV, 1000 rpm at 20° C., 65% RH, and then the half life of the voltage of the electric charge was determined.

(B) Punch Dust Test

At 20°–25° C., 50–70% RH, the optical articles were wiped with a skin of deer to electrically charge the articles. On the other hand, punch dust was scattered on a desk. The charged optical article was brought to close to the punch dust to a distance of 1–2 cm from the dust. The optical article was fixed in the same position for 30 minutes, and the number of dust retained by the article without falling down was counted.

EXAMPLE 7

(1) Preparation of Fluorine-Containing Composition (a) Preparation of Hydrolysate To a reactor with a rotating member of a magnetic stirrer, 5.2 g of γ-glycidoxypropyltrimethoxysilane and 3.1 g of 3,3,3-trifluoropropyltrimethoxysilane were fed.

TABLE 2

| | 3,3,3-trifluorotrimethoxysilane (parts by weight) | Methyltrimethoxysilane (parts by weight) | γ-glycidoxypropyltrimethoxysilane (parts by weight) | Total Light Transmittance (%) | Steel Wool Hardness | Dyeability (%) | Top Film Film Thickness | Top Film Index of Reflaction |
|---|---|---|---|---|---|---|---|---|
| Example 2 | 50 | 50 | 0 | 96.4 | A | 40.0 | 100 | 1.39 |
| Example 3 | 41 | 41 | 18 | 96.6 | A | 35.7 | 110 | 1.40 |
| Example 4 | 65 | 0 | 35 | 96.1 | B | 15.6 | 90 | 1.38 |
| Comparative Example 2 | 50 | 50 | 0 | 95.4 | C | 45.3 | 100 | 1.39 |

EXAMPLES 5 and 6

The optical articles obtained in Examples 1 and 2 were subjected to an anti-static treatment by using a surface treatment plasma-generating apparatus (PR501A, commercially available from Yamato Kagaku Co., Japan) with 100 ml/min. of oxygen flow and with an output power of 50W for 3 minutes.

The fluorine/silicon ratio (F/Si) by weight of the thus treated top film was 0.04/1 in the uppermost region thereof. The average fluorine/silicon ratio in the entire top film was 0.08/1.

The total light transmittance of the optical article was 96.1% (Example 5) and 96.4% (Example 6). In both examples, the half life of the voltage of the electric charge as determined by the method described below was not more than 1 second, and the punch dust was not attached at all to the article from the begining in the punch dust test hereinafter described.

For comparison, the optical articles which were not subjected to the anti-static treatment were tested for their half life of the voltage of the electric charge and were subjected to a punch dust test. The fluorine/silicon ratio in the top film of the articles was 0.08/1 by weight. The half life of the voltage of the electric charge was 121 seconds (untreated article of Example 5) or 360 seconds or more (untreated article of Example 6), and the results of the punch dust test were 20 and 30, respectively. Thus, the untreated optical articles were likely to be charged.

While keeping the temperature of the liquid at 30° C. and stirring the liquid with the magnetic stirrer, 2.8 g of 0.01 N aqueous hydrochloric acid was added dropwise. After addition of the hydrochloric acid, the mixture was stirred for 10 minutes at room temperature to obtain a hydrolysate.

(b) Preparation of Coating Composition

To the thus obtained hydrolysate, were added 141.6 g of n-propyl alcohol, 60.7 g of distilled water and 18.8 g of ethylCellosolve and the mixture was stirred. To the resulting mixture, were added 16.0 g of methanol silica sol, 2.2 g of silicone-based surface active agent in n-propyl alcohol at a concentration of 5% by weight, and 0.6 g of aluminum acetylacetonate. The mixture was well stirred to obtain a coating composition.

(2) Preparation of Anti-Reflection Article

An article was prepared in the same manner as in Example 1 using the substrate obtained in Example 1 (1) and the coating composition obtained in Example 1 (2), and the resulting article was subjected to a plasma treatment at 200 ml/min. of oxygen flow and at an output power of 50W for 1 minute.

Then the coating composition obtained in this example (1)(b) was coated on the thus prepared article by a spin coating method employing a rotation speed of 3,500 rpm and rotation time of 30 seconds. After coating the composition, the article was subjected to a preliminary curing at 82° C. for 12 minutes and then to a curing treatment at 110° C. for 4 hours to obtain an anti-reflection optical lens.

The total light transmittance of the thus obtained optical article was 95.2%.

The properties of the thus formed lens were tested as in Example 1-(5). The results are as follows:
Dyeability (%): 37.0
Appearance after Dying: good
Steel Wool Hardness: A

(3) Anti-Static Treatment

The optical article obtained in (2) above was subjected to a plasma treatment using a surface treatment plasma-generating apparatus (PR501A, commercially available from Yamato Kagaku Co., Japan) with an oxygen flow of 200 ml/min. and an output power of 50W for 30 seconds.

The total light transmittance of the thus treated article was 95.2%. The half life of the voltage of the electric charge was 10 seconds or less, and no punch dust was attached to the article in the punch dust test.

The fluorine/silicon (F/Si) ratio in the uppermost region of the top film was 0.05/1 by weight, while the average fluorine/silicon ratio in the entire top film was 0.07/1. The fluorine/silicon ratio in the uppermost region of the top film of the untreated article was 0.07/1 by weight.

EXAMPLE 8

(1) Preparation of Transparent Lens

A diethyleneglycolbisallyl carbonate polymer lens (diameter of 71 mm, thickness of 2.1 mm, CR-39 Planolens) with an index of refraction of 1.50 was dipped in an aeuous sodium hydroxide solution of a concentration of 20 wt % and washed. The lens was coated with the composition and the coating was cured as in Example 1 (4).

(2) Preparation of Anti-Reflection Optical Article

An anti-reflection optical article was prepared in the same manner as in Example 7-(2). The thus prepared article had the following properties:
Total Light Transmittance: 95.8%
Dyeability: 30%
Appearance after Dying: good
Steel Wool Hardness: A

(3) Anti-Static Treatment

The anti-reflection optical lens obtained in (2) was subjected to a plasma treatment in the same manner as in Example 7 (3).

The total light transmittance was 95.8%. The half life of the voltage of the electric charge was 10 seconds or less, and no punch dust was attached to the article in the punch dust test.

The fluorine/silicon (F/Si) ratio in the uppermost region of the top film was 0.05/1 by weight, while the average fluorine/silicon ratio in the entire top film was 0.07/1. The fluorine/silicon ratio in the uppermost region of the top film of the untreated article was 0.07/1 by weight.

We claim:

1. A process for producing an anti-reflection optical article which comprises:
   providing a transparent plastic substrate on which a hard coat film having an index of refraction of not less than 1.52 is formed;
   applying a liquid coating composition comprising a fluorine-containing organic silicon compound and/or a hydrolysate thereof, on the hard coat film; and
   curing the applied composition to form a fluorine-containing organopolysiloxane-based film with an index of refraction lower than that of the hard coat film by not less than 0.02.

2. The process of claim 1, wherein the fluorine-containing organic silicon compound has the formula:

$$(R^1Q)SiX_aY_{3-a} \qquad (I)$$

wherein $R^1$ is a $C_1$-$C_{20}$ flourine-containing alkyl group which may contain one or more ether bonds and/or ester bonds; Q is a divalent organic group; X is a $C_1$-$C_4$ alkyl group; Y is a halogen, alkoxy or RCOO group (wherein R is a hydrogen or a $C_1$-$C_4$ lower alkyl group); and a is an integer of 0 or 1.

3. The process of claim 1, wherein the coating composition further comprises a silica sol of a high molecular weight silic acid in the form of a colloidal dispersion.

4. A process for producing an anti-reflection optical article which comprises:
   providing a transparent plastic substrate on which a hard coat film having an index of refraction of not less than 1.52 is formed;
   applying a liquid coating composition comprising a fluorine-containing organic silicon compound and/or a hydrolysate thereof, on the hard coat film;
   heating the applied composition to form a fluorine-containing organopolysiloxane-based film with an index of refraction lower than that of the hard coat film by not less than 0.02, the silicon to fluorine ratio by weight in the entire fluorine-containing organopolysiloxane-based film is 0.02 to 10, and the ratio in the uppermost region or the fluorine-containing organopolysiloxane-based film is less than 80% that of the entire fluorine-containing organopolysiloxane-based film; and
   subjecting the surface of the thus formed fluorine-containing organopolysiloxane-based film to an activated gas treatment.

5. The process of claim 4, wherein the activated gas treatment is a plasma treatment or a corona discharge treatment.

* * * * *